United States Patent [19]

Rasshofer et al.

[11] Patent Number: 4,581,388

[45] Date of Patent: Apr. 8, 1986

[54] PROCESS FOR THE PRODUCTION OF URETHANE-MODIFIED POLYISOCYANATE USING AN OXYALKYLATED BISPHENOL

[75] Inventors: Werner Rasshofer; Richard Kopp, both of Cologne; Reiner Paul, Muelheim-Ruhr; Klaus Seel, Cologne; Otto Ganster, Leverkusen, all of Fed. Rep. of Germany

[73] Assignee: Bayer Aktiengesellschaft, Leverkusen, Fed. Rep. of Germany

[21] Appl. No.: 689,112

[22] Filed: Jan. 7, 1985

[30] Foreign Application Priority Data

Jan. 14, 1984 [DE] Fed. Rep. of Germany ....... 3401166

[51] Int. Cl.$^4$ ............................................. C08G 18/14
[52] U.S. Cl. .................................... 521/159; 528/60; 528/64; 528/65; 528/66; 528/79
[58] Field of Search .................... 521/159; 528/60, 64, 528/65, 66, 79

[56] References Cited

U.S. PATENT DOCUMENTS

| | | | |
|---|---|---|---|
| 2,843,568 | 7/1958 | Benning et al. | 528/79 |
| 3,108,084 | 10/1963 | Whitehill et al. | 528/79 |
| 3,457,225 | 7/1969 | Damisis et al. | 260/47 |
| 3,457,225 | 7/1969 | Damusis et al. | 260/47 |
| 3,644,457 | 2/1972 | König et al. | 260/453 SP |
| 3,737,391 | 6/1973 | Feltzin et al. | 528/79 |
| 3,883,571 | 5/1975 | Allport et al. | 260/453 AM |
| 4,031,026 | 6/1977 | Ibbotson | 252/182 |
| 4,055,548 | 10/1977 | Carleton et al. | 260/77.5 AT |
| 4,115,429 | 9/1978 | Reiff et al. | 260/453 SP |
| 4,118,411 | 10/1978 | Reiff et al. | 260/453 SP |
| 4,125,545 | 11/1978 | Kroplinski et al. | 260/404.5 |
| 4,192,928 | 3/1980 | Tanaka et al. | 528/79 |
| 4,229,347 | 10/1980 | Holt et al. | 260/239 A |
| 4,234,714 | 11/1980 | Earing et al. | 528/67 |
| 4,251,639 | 2/1981 | Jarre et al. | 521/159 |
| 4,261,852 | 4/1981 | Carroll et al. | 528/59 |
| 4,321,333 | 3/1982 | Alberino et al. | 521/159 |

FOREIGN PATENT DOCUMENTS

| | | |
|---|---|---|
| 1129599 | 8/1982 | Canada . |
| 1178603 | 11/1984 | Canada . |
| 0093357 | 11/1983 | European Pat. Off. . |
| 1285052 | 8/1972 | United Kingdom . |
| 1369334 | 10/1974 | United Kingdom . |
| 1430455 | 3/1976 | United Kingdom . |
| 1444192 | 7/1976 | United Kingdom . |
| 1450660 | 9/1976 | United Kingdom . |
| 1545003 | 4/1979 | United Kingdom . |
| 1577767 | 10/1980 | United Kingdom . |

*Primary Examiner*—Maurice J. Welsh
*Attorney, Agent, or Firm*—Gene Harsh; Joseph C. Gil; Lyndanne M. Whalen

[57] ABSTRACT

Urethane-modified polyisocyanates having an NCO-content of from 5 to 45 wt. % are made by reacting an organic polyisocyanate or mixture of polyisocyanates having an NCO-content of from 30 to 50 wt. % with an organic polyhydroxyl compound or mixtures of polyhydroxyl compounds. The organic polyhydroxyl compound must include at least 10 hydroxyl equivalent percent of an alkoxylation product of a bisphenol corresponding to a specified formula containing two alcoholic hydroxyl groups and having an OH number of from 112 to 389. The reactants are employed in quantities such that the NCO:OH equivalent ratio is from 2:1 to 50:1. The urethane-modified polyisocyanates of the present invention are particularly useful in the production of polyurethanes by the isocyanate polyaddition process.

4 Claims, No Drawings

PROCESS FOR THE PRODUCTION OF URETHANE-MODIFIED POLYISOCYANATE USING AN OXYALKYLATED BISPHENOL

BACKGROUND OF THE INVENTION

This invention relates to a new process for the production of urethane-modified polyisocyanates which are particularly valuable starting materials in the production of polyurethane plastics.

Processes for the production of urethane-modified polyisocyanate preparations (i.e. isocyanate-terminated prepolymers or semiprepolymers), particularly those based on polyisocyanates or polyisocyanate mixtures of the diphenyl methane series (4,4'-diisocyanatodiphenylmethane, mixtures thereof with 2,4'- and, optionally 2,2'-diisocyanatodiphenylmethane or phosgenation products of aniline/formaldehyde condensates which, in addition to these diisocyanates, contain higher homologs thereof), and a variety of different polyhydroxyl compounds are known to those skilled in the art. For example, such processes are described in European Patent Applications 10 850 and 66 130; German Offenlegungsschriften Nos. 23 47 207, 24 04 166, 25 13 793, 25 13 796, 26 20 222, 26 22 104, 27 32 182, 27 37 338, 28 04 375, 28 10 596, 28 15 579 and 29 13 126; U.S. Pat. No. 3,644,457; 4,055,548, 4,234,714 and 4,321,333 and also Great Britain No. 1,369,334. In general, the processes described in these publications are concerned with the liquefaction of diisocyanatodiphenylmethane (more particularly 4,4'-diisocyanatodiphenylmethane) which is solid at room temperature or with a reduction in the tendency towards crystallization during storage at low temperatures of polyisocyanate mixtures of the diphenylmethane series which mixtures are liquid at room temperature.

SUMMARY OF THE INVENTION

It has now surprisingly been found that urethane-modified polyisocyanates based on organic polyisocyanates, particularly aromatic polyisocyanates, and more preferably on polyisocyanates or polyisocyanate mixtures of the diphenylmethane series and alkoxylation products of bisphenols of the type described in greater detail hereinafter have a reduced melting point and a reduced tendency towards crystallization during storage at low temperatures. These urethane-modified polyisocyanates may be used in the production of polyurethane plastics, particularly polyurethane moldings, having a homogeneous surface which have considerably improved mechanical properties, such as better thermal stability, greater rigidity and better green strength coupled with high flexibility and high breaking elongation.

DETAILED DESCRIPTION OF THE INVENTION

The present invention relates to a process for the production of urethane-modified polyisocyanate preparations having an NCO-content of from 5 to 45 wt. % in which organic polyisocyanates having an NCO-content of from 30 to 50 wt. % or mixtures of organic polyisocyanates having an average NCO-content of from 30 to 50 wt. % are reacted with organic polyhydroxyl compounds in quantities such that the NCO:OH equivalent ratio is maintained at from 2:1 to 50:1 during the reaction. The organic polyhydroxyl compounds used are alkoxylation products of bisphenols containing two alcoholic hydroxyl groups and having an OH-number in the range from 112 to 389 which bisphenols correspond to the formula

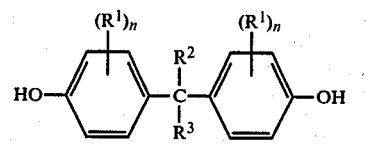

in which

R$^1$ represents a C$_1$–C$_4$-alkyl radical, chlorine or bromine,

R$^2$ and R$^3$ which may be the same or different, each represent hydrogen or C$_1$–C$_6$-alkyl radicals or, together with the carbon atom attaching the two aromatic rings, form a 5- to 7-membered cycloaliphatic hydrocarbon radical, and n=0 or an integer of from 1 to 4. Up to 90, preferably 50, hydroxyl equivalent percent of other organic polyhydroxyl compounds may be used in admixture with the alkoxylation products of bisphenols.

The urethane-modified polyisocyanates obtained by this process may be used as starting materials in the production of polyurethane plastics by the isocyanate polyaddition process.

Organic polyisocyanates having an NCO-content of from 30 to 50 wt. % or mixtures of organic polyisocyanates such as these having an average NCO-content of from 30 to 50 wt. % may be used as starting materials in the process of the present invention. Polyisocyanates containing aromatically bound isocyanate groups are preferably used. Examples of such polyisocyanates include: 2,4-diisocyanatotoluene; 2,6-diisocyanatotoluene; 1,ω-bis-(isocyanatophenyl)-alkanes such as 1,2-bis-(4-isocyanatophenyl)-ethane; alkyl-substituted and, more particularly, methyl-substituted diisocyanatodiphenylmethanes of the type described, for example, in European Patent Applications Nos. 24 665 and 46 556; and, preferably, polyisocyanates or polyisocyanate mixtures of the diphenylmethane series. Mixtures of polyisocyanates such as these may also be used in the practice of the present invention. The particularly preferred polyisocyanate mixtures of the diphenylmethane series are 4,4'-diisocyanatodiphenylmethane, mixtures thereof with 2,4'- and, optionally, 2,2'-diisocyanatodiphenylmethane having a 2,4'-diisocyanatodiphenylmethane content, based on the mixture as a whole, of up to 70 wt. % and preferably of up to 20 wt. %, the 2,2'-diisocyanatodiphenylmethane content generally not exceeding 5 wt. %, and polyisocyanates of the type obtained by phosgenating aniline/formaldehyde condensates and which, in addition to the above-mentioned diisocyanatodiphenylmethane isomers, may contain different quantities of higher homologous polyisocyanates (generally 5 to 60 wt. %, based on the mixture as a whole). Diphenylmethane polyisocyanates or mixtures thereof, optionally in admixture with up to 50 NCO equivalent percent (based on the mixture as a whole), of other aromatic polyisocyanates, are preferably used as polyisocyanates in the process of the present invention. However, it is particularly preferred to use the polyisocyanates or polyisocyanate mixtures of the diphenylmethane series as the sole polyisocyanate component.

Reactants for the polyisocyanates are alkoxylation products of bisphenols corresponding to formula I containing two alcoholic hydroxyl groups and having an OH-number of from 112 to 389 and preferably from 200 to 354. It is preferred to use alkoxylation products of bisphenols corresponding to formula I in which n=0 and $R^2$ and $R^3$ are each methyl radicals.

Starting materials for the production of the above-mentioned alkoxylation products are, for example, 4,4'-dihydroxydiphenylmethane; bisphenol A (4,4'-dihydroxy-2,2-diphenylpropane); 3,3'-dimethyl-4,4'-dihydroxy-2,2-diphenylpropane; 3,3'-di-n-hexyl-4,4'-dihydroxy-2,2-diphenylpropane; 2,3,5,6,2',3',5',6'-octachloro (or octabromo)-4,4'-dihydroxy-2,2-diphenylpropane; 4,4'-dihydroxy-2,2-diphenylhexane; 4,4'-dihydroxy-2,2-diphenyloctane and 4,4'-dihydroxy-1,1-diphenylcyclohexane. It is particularly preferred to use the alkoxylation products of bisphenol A in the process of the present invention.

The polyhydroxyl compounds used as reactants for the starting polyisocyanates are alkoxylation products containing alcoholic hydroxyl groups of starter molecules. The quantity of alkylene oxides used in carrying out this alkoxylation must be such that, on a statistical average, at least 90% and preferably all of the phenolic hydroxyl groups are converted into ether groups, so that at least 90 equivalent percent and preferably all of the hydroxyl groups of the alkoxylation products are alcoholic hydroxyl groups. The alkoxylation reaction may readily be carried out in such a way that hydroxyl-terminated polyether diols containing more than two incorporated alkylene oxide units per molecule and having a hydroxyl number of from 112 to 389 are formed. The alkylene oxides preferably used for the production of the alkoxylation products are ethylene oxide and/or propylene oxide in any order or mixtures of these alkylene oxides. The ethoxylation products and propoxylation products of bisphenol A having hydroxyl numbers in the above-mentioned range are particularly suitable for the process according to the present invention.

In addition to the above-mentioned alkoxylation products of bisphenols, other polyhydroxyl compounds may also be used in the process of the present invention in a quantity of up to 90 hydroxyl equivalent percent and preferably in a quantity of up to 50 hydroxyl equivalent percent, based on all the polyhydroxyl compounds. More particularly, the alkoxylation products of the bisphenols may be used in admixture with other polyhydroxyl compounds such as those described in the prior art publications cited above which have already been used for the modification of polyisocyanates of the diphenylmethane series. Accordingly, suitable polyhydroxyl compounds, which may optionally be used in combination with the polyhydroxyl alkoxylated bisphenols essential to the invention include simple glycols, preferably glycols containing ether groups and having an (average) molecular weight of from 62 to 700, such as ethylene glycol, 1,2-dihydroxypropane, 1,4-dihydroxybutane, polyethylene glycols and, in particular, polypropylene glycols. Linear or branched polyether polyols having a molecular weight in the range from 700 to 10,000 and preferably in the range from 2000 to 6000 such as the corresponding alkoxylation products of suitable low molecular weight starter molecules (e.g. the simple glycols just mentioned) or of suitable higher starter molecules such as glycerol or trimethylol propane. Mixtures of the above-mentioned low molecular weight and/or relatively high molecular weight polyhydroxyl compounds may of course be used together with the polyhydroxyl compounds essential to the present invention. It is also possible in principle to react successively the starting polyisocyanates with the alkoxylation products of bisphenols essential to the invention and then with the other polyhydroxyl compounds mentioned above or even in reverse order with those polyhydroxyl compounds. However, the process of the present invention is preferably carried out using only alkoxylated bisphenols of the type mentioned above.

In the processes of the present invention, the reactants are used in quantities such that the equivalent ratio of isocyanate groups to hydroxyl groups of the alkoxylated bisphenols and any optional polyhydroxyl compounds is from 2:1 to 50:1, preferably from 4:1 to 20:1.

The process of the present invention is generally carried out at a temperature in the range from 20° to 140° C. and preferably at a temperature in the range from 40° to 120° C. The reaction is generally carried out by combining the reactants at room temperature and then heating them to at most 140° C. and preferably to between 40° and 100° C. until the calculated NCO-content has been reached. It is also possible and, in some cases (particularly when the hydroxyl component has a relatively high melting point and poor solubility in the polyisocyanate) even preferred to heat the starting polyisocyanate or polyisocyanate mixture to a temperature of from 40° to 140° C. (preferably from 80° to 120° C.) and then to add the polyhydroxyl component either all at once or preferably in portions. In this connection, it is important to ensure that the temperature prevailing inside the reaction vessel does not exceed the upper limit of approximately 140° C. in order to avoid secondary reactions such as trimerization of the isocyanate groups. The resulting polyisocyanates containing urethane groups are generally so-called semiprepolymers, i.e. mixtures of unreacted starting polyisocyanate with urethane-modified NCO-prepolymers. It is only where low NCO:OH equivalent ratios within the ranges mentioned above are used that genuine NCO-prepolymers containing only very small quantities of unreacted starting polyisocyanate are formed almost exclusively in the process of the present invention. The NCO-content of the products obtained by the process of the present invention lies within the 5 to 45 wt. % limits mentioned above, depending upon the starting materials used and the quantitative ratios in which they are used. Where the preferred polyisocyanates or polyisocyanate mixtures of the diphenylmethane series are used, products having an NCO content of from 5 to 30 wt. % and, more particularly, from 18 to 28 wt. % are generally formed.

The products obtained by the process of the present invention generally have a lower melting point than the corresponding starting polyisocyanate. They may be used with advantage, optionally in admixture with other polyisocyanates of the type known to those skilled in polyurethane chemistry, for the production of polyurethane plastics. The products obtained by the process of the present invention may be used with particular advantage as the polyisocyanate component in the production of molded plastics by the "RIM" process, i.e. both for the production of rigid, semi-rigid and flexible integral foams and also for the production of the corresponding solid, i.e. at best microcellular, moldings having a gross density of from 0.8 to 1.4 and preferably from 0.9 to 1.2 g/cc.

In such applications, the products of the process of the present invention may be used either instead of or in admixture with the polyisocyanates normally used for this purpose. The organic compounds having isocyanate-reactive groups, other reactants and auxiliaries suitable for the production of polyurethanes as well as process parameters are known to those in the art. For example German Offenlegungsschriften Nos. 19 53 637, 21 21 670, 23 56 692, 23 63 452, 24 04 310, 24 27 273, 24 31 968, 23 07 589, 23 19 648, 30 12 126 and 31 47 736; U.S. Pat. Nos. 4,065,410 and 4,218,543 and published European Patent Applications (publication numbers) 17 928, 44 481 or 81 701 each disclose appropriate materials and process parameters for the production of polyurethanes.

The products obtained by the process of the present invention may of course also be used with advantage as polyisocyanate component in the production of polyurethane plastics, such as free-foamed rigid, semi-rigid or flexible polyurethane foams, either instead of or in admixture with the polyisocyanates previously used for that purpose.

The polyurethane plastics obtained using the products of the process of the present invention are distinguished by excellent mechanical properties. These polyurethanes may be used for the same applications as state-of-the-art polyurethane plastics.

In the following Examples, all of the percentages quoted represent percentages by weight and all of the parts quoted represent parts by weight.

EXAMPLES

The following compounds were used to produce the urethane-modified polyisocyanate preparations (NCO-semiprepolymers) in the Examples which follow:

Polyisocyanate I: 4,4'-diisocyanatodiphenylmethane (NCO-content: 33.6%).

Polyisocyanate II: A mixture of 60% of 4,4'- and 40% of 2,4'-diisocyanatodiphenylmethane (NCO-content: 33.5%).

Polyisocyanate III: A mixture of 83% of 4,4'-diisocyanatodiphenylmethane, 7% of 2,4'-diisocyanatodiphenylmethane and 10% of higher polyisocyanates of the diphenylmethane series (NCO-content: 31.8%).

Polyisocyanate IV: The crude phosgenation product of an aniline/formaldehyde condensate from which so much diisocyanatodiphenylmethane isomers had been distilled off that the distillation residue had a viscosity at 25° C. of 100 cP (NCO-content: 31%).

Diol I: 4,4'-bis-[(2-hydroxyethoxy)phenyl]-2,2-propane obtained by the ethoxylation of bisphenol A (hydroxyl number 354).

Diol II: The propoxylation product of bisphenol A having an OH number of 320.

Diol III: The propoxylation product of bisphenol A having an OH number of 200.

Polyol IV: A polyether polyol having an OH number of 28 produced by the propoxylation of trimethylol propane, followed by ethoxylation of the propoxylation product (ratio by weight of PO to EO=87:13).

Diol V: Dipropylene glycol

Diol VI: Tripropylene glycol.

EXAMPLE 1

(Process according to the invention)

The starting polyisocyanates specified below were mixed at 25° C. with the diols identified below, after which the reaction mixtures were heated with stirring for 4 hours to 80° C. The NCO-prepolymers I to XIX described below were each obtained in this way, unless otherwise indicated. The NCO-contents indicated correspond to the values obtained by analysis.

NCO-semiprepolymer I: from polyisocyanate I (5.9 moles of NCO) and diol I (1 mole of OH). Viscosity (25° C.)=2600 mPas, NCO=22.4 wt. %.

NCO-semiprepolymer II: from polyisocyanate II (5.03 moles of NCO) and diol I (1 mole of OH). Viscosity (25° C.)=41800 mPas, (40° C.)=5300 mPas, NCO=20.0 wt. %.

NCO-semiprepolymer III: from polyisocyanate III (6.91 moles of NCO) and diol II (1 mole of OH). Viscosity (25° C.)=6390 mPas, NCO=22.5 wt. %.

NCO-semiprepolymer IV: from polyisocyanate IV (25 moles of NCO) and diol II (1 mole of OH). Viscosity (25° C.)=675 mPas, NCO=27.9 wt. %.

NCO-semiprepolymer V: from polyisocyanate III (8.83 moles of NCO) and diol III (1 mole of OH). Viscosity (25° C.)=1100 mPas, NCO=22.9 wt. %.

NCO-semiprepolymer VI: from polyisocyanate II (9.26 moles of NCO) and diol I (1 mole of OH). Viscosity (25° C.)=65,000 mPas, NCO=24.3 wt. %.

NCO-semiprepolymer VII: from polyisocyanate III (7.6 moles of NCO) and a mixture of diols I (0.08 mole OH) and II (0.84 mole OH). Viscosity (25° C.)=6000 mPas, NCO=22.6 wt. %.

NCO-semiprepolymer VIII: from polyisocyanate III (7.6 moles of NCO) and a mixture of diols I (0.1 mole OH) and II (0.9 mole OH). Viscosity (25° C.)=6200 mPas, NCO=22.9 wt. %.

NCO-semiprepolymer IX: from polyisocyanate III (6.91 moles NCO) and diol II (1 mole OH), heating for 2 hours to 80° C., addition to diol III (0.49 mole), stirring for 3 hours at 80° C. and further addition of isocyanate III (0.58 mole NCO). Viscosity (25° C.)=40,000 mPas, NCO=19.9 wt. %.

NCO-semiprepolymer X: from polyisocyanate III (6.91 moles NCO) and a mixture of diols II (1 mole OH) and III (0.44 mole OH), further addition of isocyanate III (0.55 mole NCO). Viscosity (25° C.)=47,000 mPas, NCO=19.8 wt. %.

NCO-semiprepolymer XI: from polyisocyanate III (9.31 moles NCO) and diol II (1 mole OH). Viscosity (25° C.)=830 mPas, NCO=24.5 wt. %.

NCO-semiprepolymer XII: from polyisocyanate I (11.99 moles NCO) and polyol I (1 mole OH). Viscosity (40° C.)=35 mPas, NCO=26.8 wt. %.

NCO-semiprepolymer XIII: from polyisocyanate III and diol II (4.76 moles NCO to 1 mole OH). NCO=20.6 wt. %. Viscosity (25° C.)=22,100 mPas.

NCO-semiprepolymer XIV: from polyisocyanate III (5.3 moles NCO) and diol II (0.78 mole OH) by combination at 25° C. and stirring for 3 hours at 80° C., followed by the addition of polyol IV (0.104 mole OH) and stirring for another 3 hours at 80° C. Viscosity (28° C.)=15,000 mPas, NCO=17.95 wt. %.

NCO-semiprepolymer XV: same formulation as for semiprepolymer XIV, except that diol II and polyol IV were added in the form of a mixture. Viscosity (25° C.)=8400 mPas, NCO=18.3 wt. %.

NCO-semiprepolymer XVI: from polyisocyanate III (3.78 moles NCO) and a mixture of diols I (0.12 mole OH) and II (0.7 mole OH) by combination at 25° C. and heating for 3 hours at 80° C., followed by the addition of polyol IV (0.094 mole OH) and heating for another 3 hours to 80° C. Viscosity (25° C.)=34,000 mPas, NCO=14.5 wt. %.

NCO-semiprepolymer XVII: from polyisocyanate I (20 moles NCO) and a mixture of diols I (1.08 mole OH) and V (1.08 mole OH). Viscosity (25° C.)=1200 mPas, NCO=23.7 wt. %.

NCO-semiprepolymer XVIII: from polyisocyanate III (20 moles NCO) and a mixture of diols II (1.08 mole OH) and V (1.08 mole OH). Viscosity (25° C.)=1650 mPas, NCO=24.2 wt. %.

NCO-semiprepolymer XIX: from polyisocyanate I (3.37 moles NCO) and a mixture of diols II (0.31 mole OH) and VI (0.08 mole OH). Viscosity (25° C.)=850 mPas, NCO=23 wt. %.

APPLICATION EXAMPLES

Examples 2 to 15 were carried out using a standard, commercially available piston metering unit equipped with a positively controlled mixing head (a Rimdomat ® piston metering unit equipped with a plunger-cleaned throttle slide mixing head MQ of the type manufactured by the Hennecke Company of St. Augustin). The mold used was a closed aluminum mold internally measuring 500×350×4 mm of which the inner walls had been sprayed with a commercially available wax-based mold release agent (Acmos ® 180 ST/5, a product of the Acmos Company). In each case, the internal temperature of the mold was 60° C. and the temperature of the starting materials 45° C. The mold filling time was 1.5 seconds in each case and the residence time in the mold 30 seconds. In all the Examples, the NCO-index was 110.

EXAMPLE 2

| 2A | 2B | Formulation 20 | |
|---|---|---|---|
| 100 | 100 | 100 | parts of a polyether triol having an OH number of 28, obtained by the blockwise addition of 83% of propylene oxide and then 17% of ethylene oxide onto trimethylol propane were combined with |
| 22 | 24 | 30 | parts of a mixture of 65 parts of 3,5-diethyl-2,4-tolylene diamine (amine I), |
| 0.1 | 0.1 | 0.1 | part of triethylene diamine, |
| 0.1 | 0.1 | 0.1 | part of dimethyl tin dilaurate and |
| 61.7 | 68.9 | 80.7 | parts of NCO-semiprepolymer II. |

The following properties were obtained:

| Unit weight | 2A | 2B | 2C |
|---|---|---|---|
| (kg/m$^3$, DIN 53420) | 1083 | 1100 | 1094 |
| Tensile strength (MPa, DIN 53 504) | 24 ± 0.8 | 25.7 ± 2 | 30.9 ± 1.6 |
| Breaking elongation (%, DIN 53504) | 223 ± 3 | 207 ± 15 | 202 ± 8 |
| Sag value (½ h, 160° C) (mm) | 13.5 | 7.5 | 6.5 |
| E-modulus in flexure (MPa, ASTM-D 790) | 173 | 238 | 320 |

EXAMPLE 3

| 3A | 3B | Formulation: |
|---|---|---|
| 100 | 100 | parts of the polyether triol used in Example 1 were combined with |
| 40 | 55 | parts of a mixture of 50% of 3,5-diethyl-3',5'-diisopropyl-4,4'-diaminodiphenylmethane, 25% of 3,5,3',5'-tetraethyl-4,4'-diaminodiphenylmethane and 25% of 3,5,3',5'-tetraisopropyl-4,4'-diaminodiphenylmethane, |
| 0.1 | 0.1 | part of triethylene diamine |
| 0.1 | 0.1 | part of the tin catalyst used in Example 2 and |
| 58.9 | 77.6 | parts of NCO-prepolymer I. |

The following properties were obtained (same test methods as in Example 2):

| | 3A | 3B |
|---|---|---|
| Unit weight (kg/m$^3$) | 1102 | 1081 |
| Tensile strength (MPa) | 32.5 ± 2.5 | 33.2 ± 1.5 |
| Breaking elongation (%) | 288 ± 15 | 245 ± 7 |
| Sag value (½ h, 160° C.) (mm) | 2 | 2.5 |
| E-modulus in flexure (MPa) | 228 | 395 |

EXAMPLE 4

| 4A | 4B | 4C | 4D | Formulation: |
|---|---|---|---|---|
| 100 | 100 | 100 | 100 | parts of the polyether triol of Example 2 were combined with |
| 22 | 25 | 30 | 33.5 | parts of amine I from Example 2, |
| 0.1 | 0.1 | 0.1 | 0.1 | part of triethylene diamine, |
| 0.1 | 0.1 | 0.1 | 0.1 | part of the same tin catalyst as in Example 2 and |
| 59.9 | 67.0 | 78.1 | 85.2 | parts of the NCO-semiprepolymer III. |

The following properties were obtained (same test methods as in Example 2):

| | 4A | 4B | 4C | 4D |
|---|---|---|---|---|
| Unit weight (kg/m$^3$) | 1073 | 1080 | 1074 | 1082 |
| Tensile strength (MPa) | 23.5 | 26.5 | 29.5 | 30.5 |
| Breaking elongation (%) | 224 | 223 | 201 | 184 |
| Sag value (½ h, 160° C.) (mm) | 9 | 7 | 4 | 4 |
| E-modulus in flexure (MPa) | 196 | 269 | 376 | 438 |

EXAMPLE 5

(Comparison)

This Example 5 is a comparison with Example 4. Instead of an NCO-semiprepolymer according to the invention, a standard commercially available product was used.

| | | | | Formulation: |
|---|---|---|---|---|
| 5A | 5B | 5C | 5D | |
| 100 | 100 | 100 | 100 | parts of the polyether triol used in Example 2 were combined with |
| 22 | 25 | 30 | 33.5 | parts of amine I from Example 2, |
| 0.1 | 0.1 | 0.1 | part of triethylene diamine, | |
| 0.1 | 0.1 | 0.1 | 0.1 | part of the same tin catalyst as in Example 2, and |
| 55.6 | 62.6 | 72.9 | 79.9 | parts of an isocyanate having an NCO-content of 24.5% obtained by reacting polyisocyanate III with dipropylene glycol. |

The following properties were obtained (same test methods as in Example 2):

| | 5A | 5B | 5C | 5D |
|---|---|---|---|---|
| Unit weight (kg/m³) | 1083 | 1085 | 1098 | 1085 |
| Tensile strength (MPa) | 23.5 | 25 | 28 | 29 |
| Breaking elongation (%) | 254 | 241 | 226 | 205 |
| Sag value (½ h, 160° C.) (mm) | 10 | 7 | 4 | 5 |
| E-modulus in flexure (MPa) | 181 | 229 | 329 | 406 |

EXAMPLE 6

| | | | | Formulation: |
|---|---|---|---|---|
| 6A | 6B | 6C | 6D | |
| 100 | 100 | 100 | 100 | parts of a filler polyol (OH number 28) of 20 parts of a styrene/acrylonitrile copolymer of 60% acrylonitrile and 40% styrene and 80 parts of a polyether triol (OH number 35) obtained by the addition of 83% propylene oxide and 17% ethylene oxide onto trimethylol propane were combined with |
| 19 | 22 | 25 | 30 | parts of amine I from Example 2, |
| 0.1 | 0.1 | 0.1 | 0.1 | part of triethylene diamine, |
| 0.1 | 0.1 | 0.1 | 0.1 | part of the same tin catalyst as in Example 2, and |
| 53.6 | 59.9 | 67 | 78.1 | parts of NCO-semiprepolymer III. |

The following properties were obtained (same test methods as in Example 2):

| | 6A | 6B | 6C | 6D |
|---|---|---|---|---|
| Unit weight (kg/m³) | 1056 | 1080 | 1099 | 1099 |
| Tensile strength (MPa) | 25.8 | 29 | 34.1 | 35.5 |
| Breaking elongation (%) | 184 | 169 | 184 | 140 |
| Sag value (½ h, 160° C.) (mm) | 16 | 10 | 6 | 8 |
| E-modulus in flexure (MPa) | 318 | 385 | 492 | 637 |

EXAMPLE 7

(Comparison)

This Example 7 is a comparison with Example 6. Instead of an NCO-prepolymer according to the invention, a standard commercially available NCO-semiprepolymer was used.

| | | | | Formulation: |
|---|---|---|---|---|
| 7A | 7B | 7C | 7D | |
| 100 | 100 | 100 | 100 | parts of the filler polyol used in Example 6 were combined with |
| 19 | 22 | 25 | 30 | parts of amine I from Example 2, |
| 0.1 | 0.1 | 0.1 | 0.1 | part of triethylene diamine, |
| 0.1 | 0.1 | 0.1 | 0.1 | part of the same tin catalyst as in Example 2 and |
| 49.5 | 55.6 | 62.0 | 72.9 | parts of the same isocyanate as was used in Example 5. |

The following properties were obtained (same test methods as in Example 2):

| | 7A | 7B | 7C | 7D |
|---|---|---|---|---|
| Unit weight (kg/m³) | 1073 | 1072 | 1075 | 1083 |
| Tensile strength (MPa) | 25.7 | 27 | 27 | 30 |
| Breaking elongation (%) | 183 | 183 | 176 | 172 |
| Sag value (½ h, 160° C.) (mm) | 15 | 10 | 7 | 3 |
| E-modulus in flexure (MPa) | 279 | 362 | 435 | 551 |

EXAMPLE 8

In Example 8, a polyether containing terminal aromatic amino groups was used instead of the polyether triols of Examples 2 to 7.

| | | | Formulation: |
|---|---|---|---|
| 8A | 8B | 8C | |
| 100 | 100 | 100 | parts of an aminopolyether having an NH-number of 47.0 (mg KOH/g) and a viscosity (25° C.) of 12,000 mPas was combined with the materials listed below. This aminopolyether was obtained by the basic hydrolysis of the terminal NCO-groups of an NCO-prepolymer according to German Offenlegungsschrift 31 31 252. The NCO-prepolymer itself had an NCO-content of 3.6% and was the thin-layered reaction product of 2,4-diisocyanato-toluene and a polyether mixture of 2 parts of a polyether produced from a mixture of trimethylol propane and water by the addition of propylene oxide and then ethylene oxide and having an OH-number of 56, a functionality of 2.4 and a molecular weight of 2400 and 1 part of a polyether produced from glycerin by the blockwise addition of propylene oxide, ethylene oxide, propylene oxide and again ethylene oxide and having an OH-number of 35, a functionality of 3 and a molecular weight of 4800. |
| 22 | 25 | 30 | parts of amine I from Example 2, |
| 0.1 | 0.1 | 0.1 | part of triethylene diamine, |
| 0.1 | 0.1 | 0.1 | part of the same tin catalyst as in Example 2 and |
| 67.2 | 73.9 | 84.6 | parts of NCO-semiprepolymer III were added. |

The following properties were obtained (same test methods as in Example 2):

|  | 8A | 8B | 8C |
|---|---|---|---|
| Unit weight (kg/m³) | 1104 | 1079 | 1076 |
| Tensile strength (MPa) | 29.9 | 36.6 | 41.5 |
| Elongation (%) | 142 | 142 | 116 |
| Sag value (½ h, 160° C.) (mm) | 12 | 8 | 3 |
| E-modulus in flexure (MPa) | 452 | 638 | 779 |

EXAMPLE 9

(Comparison)

This Example 9 is a comparison with Example 8. Instead of an NCO-semiprepolymer according to the invention, a standard commercially available product was used.

| Formulation: | | | |
|---|---|---|---|
| 9A | 9B | 9C | |
| 100 | 100 | 100 | parts of the aminopolyether used in Example 8 were combined with |
| 22 | 25 | 30 | parts of amine I from Example 2, |
| 0.1 | 0.1 | 0.1 | part of triethylene diamine, |
| 0.1 | 0.1 | 0.1 | part of the same tin catalyst as in Example 2 and |
| 62.3 | 68.2 | 78.8 | parts of the same isocyanate used in Example 5. |

The following properties were obtained (same test methods as in Example 2):

|  | 9A | 9B | 9C |
|---|---|---|---|
| Unit weight (kg/m³) | 1062 | 1061 | 1079 |
| Tensile strength (MPa) | 31 | 31 | 33 |
| Elongation (%) | 182 | 176 | 158 |
| Sag value (½ h, 160° C.) (mm) | 14 | 9 | 4 |
| E-modulus in flexure (MPa) | 417 | 480 | 651 |

EXAMPLES 10 AND 11

| Formulations: | | | | |
|---|---|---|---|---|
| 10A | 10B | 11A | 11B | |
| 100 | 100 | — | — | parts of the polyether triol used in Example 2 or |
| — | — | 100 | 100 | parts of a polyether triol obtained by the blockwise addition of 80% of propylene oxide and 20% of ethylene oxide onto 1,2-propane diol (OH number 28) were combined with |
| 40 | 55 | — | — | parts of the amine used in Example 3 or |
| — | — | 22 | 30 | parts of amine I from Example 2, |
| 0.1 | 0.1 | 0.1 | 0.1 | part of triethylene diamine, |
| 0.1 | 0.1 | 0.1 | 0.1 | part of the same tin catalyst as in Example 2 and |
| 57.5 | 76.0 | 61.1 | 78.8 | parts of the NCO-semiprepolymer III. |

The following properties were obtained (same test methods as in Example 2):

|  | 10A | 10B | 11A | 11B |
|---|---|---|---|---|
| Unit weight (kg/m³) | 1078 | 1068 | 1091 | 1084 |
| Tensile strength (MPa) | 26.4 ± 0.8 | 31.4 ± 2.5 | 29.5 ± 1.5 | 28.1 ± 3.5 |
| Breaking elongation (%) | 253 ± 3 | 220 ± 3 | 307 ± 13 | 219 ± 27 |
| Sag value (½ h, 160° C.) (mm) | 6 | 2 | 9 | 3.5 |
| E-modulus in flexure (MPa) | 265 | 411 | 263 | 424 |

EXAMPLE 12

| Formulation: | | | |
|---|---|---|---|
| 12A | 12B | 12C | |
| 100 | 100 | 100 | parts of the polyether triol of Example 2 were combined with |
| 22 | 25 | 30 | parts of amine I from Example 2, |
| 0.1 | 0.1 | 0.1 | part of triethylene diamine, |
| 0.1 | 0.1 | 0.1 | part of the same tin catalyst as in Example 2 and |
| 59.9 | 67.0 | 78.1 | parts of NCO-semiprepolymer V. |

The following mechanical values were obtained (same test methods as in Example 2):

|  | 12A | 12B | 12C |
|---|---|---|---|
| Unit weight (kg/m³) | 1089 | 1068 | 1100 |
| Tensile strength (MPa) | 18.3 ± 0.9 | 26.1 ± 1 | 28.4 ± 1.4 |
| Breaking elongation (%) | 109 ± 4 | 230 ± 7 | 226 ± 9 |
| Sag value (160° C., ½ h) (mm) | 10.5 | 11 | 7 |
| E-modulus in flexure (MPa) | 152 | 229 | 297 |

EXAMPLE 13

| Formulation: | | | |
|---|---|---|---|
| 13A | 13B | 13C | |
| 100 | 100 | 100 | parts of the polyether triol of Example 2 were combined with |
| 22 | 25 | 30 | parts of amine I from Example 2, |
| 0.1 | 0.1 | 0.1 | part of triethylene diamine, |
| 0.1 | 0.1 | 0.1 | part of the same tin catalyst as in Example 2 and |
| 56 | 65 | 74 | parts of NCO-prepolymer II. |

The following properties were obtained (same test methods as in Example 2):

|  | 13A | 13B | 13C |
|---|---|---|---|
| Unit weight (kg/m³) | 1050 | 1070 | 1050 |
| Tensile strength (MPa) | 21 | 23 | 27 |
| Elongation (%) | 310 | 300 | 260 |
| Sag value (½ h, 160° C.) (mm) | 17 | 8 | 7 |
| E-modulus in flexure (MPa) | 150 | 210 | 290 |

EXAMPLE 14

| Formulation: | | | |
|---|---|---|---|
| 14A | 14B | 14C | |
| 100 | 100 | 100 | parts of the polyether triol of Example 2 were combined with |
| 22 | 25 | 30 | parts of amine I from Example 2, |
| 0.1 | 0.1 | 0.1 | part of triethylene diamine, |
| 0.1 | 0.1 | 0.1 | part of the same tin catalyst as in Example 2 and |
| 41 | 44 | 50 | parts of NCO-prepolymer IV. |

The following properties were obtained (same test methods as in Example 2):

|  | 14A | 14B | 14C |
|---|---|---|---|
| Unit weight (kg/m³) | 1100 | 1090 | 1090 |
| Tensile strength (MPa) | 24 | 26 | 68 |
| Breaking elongation (%) | 170 | 165 | 155 |
| Sag value (½ 160° C.) (mm) | 6 | 5 | 2 |
| E-modulus in flexure (MPa) | 180 | 240 | 280 |

EXAMPLE 15

| Formulation: | | | |
|---|---|---|---|
| 15A | 15B | 15C | |
| 100 | 100 | 100 | parts of the polyether triol of Example 2 were combined with |
| 25 | 25 | 30 | parts of amine I from Example 2, |
| 0.1 | 0.1 | 0.1 | part of triethylene diamine, |
| 0.1 | 0.1 | 0.1 | part of the same tin catalyst as in Example 2 and |
| 56 | 65 | 74 | parts of NCO-semiprepolymer VI |

The following properties were obtained (same test methods as in Example 2):

|  | 15A | 15B | 15C |
|---|---|---|---|
| Unit weight (kg/m³) | 1060 | 1050 | 1050 |
| Tensile strength (MPa) | 23 | 25 | 29 |
| Breaking elongation (%) | 290 | 280 | 240 |
| Sag value (½ h, 160° C.) (mm) | 14 | 12 | 6 |
| E-modulus in flexure (MPa) | 170 | 220 | 210 |

EXAMPLE 16

In contrast to Examples 2 to 15, Example 16 was carried out using a 2 liter-Rimdomat, a high-pressure apparatus manufactured by the Hennecke Company of St. Augustin with a mixing head of the type manufactured by the Krauss-Maffei Company of Munich. The working pressure was 180 bars on both components. The temperature of the starting materials was 40° C. The mold which was a steel mold internally measuring 200×200×4 mm, with the inner walls sprayed with the standard commercially available mold release agent as in Examples 2 to 15 was at a temperature of 60° C. The filling time was 1.5 seconds and the residence time in the mold was 60 seconds.

| Formulation: | | | |
|---|---|---|---|
| 16A | 16B | 16C | |
| 77 | 77 | 77 | parts of the polyether triol of Example 2 were combined with |
| 23 | 23 | 23 | parts of amine I from Example 2, |
| 0.2 | 0.2 | 0.2 | part of the same tin catalyst as in Example 2, |
| 0.6 | 0.6 | 0.6 | part of a 33% solution of triethylene diamine in dipropylene glycol, |
| 58.8 | — | — | parts of semiprepolymer III (Index 105), |
| — | 67.2 | — | parts of semiprepolymer XIII (Index 105) and |
| — | — | 55 | parts of the isocyanate used in Example 5 |

The following mechanical properties were obtained:

|  | 16A | 16B | 16C |
|---|---|---|---|
| Unit weight (kg/m³) DIN 53 420) | 1093 | 1102 | 1100 |
| Tensile strength RT (MPa, DIN 53 504) | 29 | 32.9 | 26 |
| Breaking elongation (%, DIN 53 504) | 269 | 224 | 250 |
| Tear propagation resistance (kN/m, DIN 53 515) | 106 | 59.8 | 65 |
| Shore D hardness (DIN 53 505) | 59 | 68 | 58 |
| Modulus at 50% (MPa, DIN 53 504) | 14.1 | 18.4 | 14.2 |
| Modulus in flexure RT (MPa, ASTM D-790) | 414 | 585 | 350 |

EXAMPLE 17

A semi-rigid integral foam having a density of 700 was produced from the following formulations:

| 17A | 17B | 17C | |
|---|---|---|---|
| 95 | 95 | 95 | parts of a polyether triol having an OH number of 27 obtained by the blockwise addition of 78% of propylene oxide and then 22% of ethylene oxide onto trimethylol propane were combined with |
| 23.5 | 23.5 | 23.5 | parts of ethylene glycol, |
| 15 | 15 | 15 | parts of dichloromethane, |
| 0.1 | 0.1 | 0.1 | part of triethylene diamine, |
| 0,15 | 0,15 | 0,15 | parts of the same tin catalyst as in Example 2 |
| 278 | | | parts of the isocyanate used in Example 5 or |
| | 292 | | parts of the commercially available isocyanate having an NCO content of 23% obtained by reacting 4,4'-diisocyanatodiphenylmethane with tripropylene glycol or |
| | | 276 | parts of NCO-semiprepolymer III. |

The components were intensively mixed and the reaction mixture was introduced into a closed steel mold internally measuring 20×20×1 cm which had been heated to 50° C. and of which the inner walls have been sprayed with the same standard commercially available release agent used in Examples 2 to 15.

The following properties were obtained (same test methods as in Example 16):

|  | 17A | 17B | 17C |
|---|---|---|---|
| Unit weight (kg/m³) | 694 | 710 | 698 |
| Shore D hardness | 60 | 53 | 65 |
| E-modulus in flexure (MPa) | | | |
| +120° C. | 15 | 21 | 12 |
| RT | 281 | 252 | 357 |
| Tensile strength | 9.1 | 7.6 | 9.1 |
| Breaking elongation (%) | 71.3 | 71.0 | 59 |
| Sag value (160° C./30 mins.) (mm) | 12.8 | 12.7 | 9.3 |

Examples 17A and 17B are comparison Examples.

EXAMPLE 18

| Formulation: | |
|---|---|
| 95 | parts of the polyether triol of Example 15, |
| 23.5 | parts of ethylene glycol, |
| 10 | parts of dichloromethane, |
| 0.1 | part of triethylene diamine and |

| Formulation: | |
|---|---|
| 0.12 | part of the tin catalyst of Example 1 | were intensively mixed at room temperature and the resulting mixture subsequently mixed with one of the following isocyanates:

A: 253 parts of the commercially available isocyanate used in Example 5 (for comparison)
B: 279 parts of NCO-semiprepolymer III
C: 279 parts of NCO-semiprepolymer VII
D: 279 parts of NCO-semiprepolymer VIII
E: 279 parts of NCO-semiprepolymer IX
F: 279 parts of NCO-semiprepolymer X
G: 270 parts of NCO-semiprepolymer XI (0.2 part of triethylene diamine, 0.18 part of the Sn catalyst of Example 2)
H: 250 parts of NCO-semiprepolymer XII.

The resulting reaction mixture was subsquently introduced into the steel mold described in Example 17 heated to 60° C. and left to harden therein. The residence time in the mold was 2 minutes.

Example 18A is a Comparison Example.

The mechanical properties of each product are given in Table 1.

TABLE 1*

| | 18A | 18B | 18C | 18D | 18E | 18F | 18G | 18H |
|---|---|---|---|---|---|---|---|---|
| Unit weight | 1005 | 1002 | 998 | 1012 | 1000 | 1013 | 1005 | 1007 |
| Shore D hardness | 66 | 71 | 69 | 70 | 71 | 73 | 69 | 70 |
| E-modulus in flexure (MPa) RT | 361 | 594 | 579 | 564 | 559 | 727 | 396 | 494 |
| 120° C. | 13 | 16 | 17 | 13 | 11 | 8 | 17 | 16 |
| E-modulus (MPa) from tensile testing | 275 | 464 | 448 | 446 | 470 | 598 | 353 | 360 |
| Breaking elongation (%) | 36 | 57 | 7.7 | 26 | 68 | 64 | 19.3 | 10 |
| Tensile strength (MPa) | 12.6 | 17.4 | 12.9 | 16.4 | 14.9 | 18.0 | 13.9 | 14.1 |
| Sag value (160° C./30 mins.) (mm) | 10.4 | 10.7 | 7.3 | 10.4 | 14.6 | 8.3 | 8.1 | 5.2 |

*(Same test methods as in Example 16. E-modulus according to DIN 53504).

EXAMPLE 19

| | | Formulation: |
|---|---|---|
| 19A | 19B | |
| 100 | 100 | parts of a polyol mixture having an OH number of 56 and a viscosity (25° C.) of 850 mPas, produced by mixing |
| | | (a) 100 parts of a polyether (OH number 35) produced by the addition of 82.5% of propylene oxide and 17.5% of ethylene oxide onto trimethylol propane with |
| | | (b) 10 parts of a polyether (OH number 150) produced by the addition of 87% of propylene oxide and 13% of ethylene oxide onto propylene glycol, |
| 1.4 | 1.4 | parts of a solution of 20 wt. % potassium acetate and 80 wt. % dipropylene glycol, |
| 200 | — | parts of the commercially available isocyanate used in Example 5 or |
| — | 200 | parts of NCO-semiprepolymer XII were combined. |

Solid, 10 mm thick moldings (200×200×10 mm) were cast from the intensively stirred mixture in the steel mold described in Example 17 (T=70° C.) and hardened (residence time in the mold: 1 minute), NCO-index=1213 (19A) and 1280 (19B).

Example 19A is a Comparison Example.
The following properties were obtained (same test methods as in Example 16):

| | 19A | 19B |
|---|---|---|
| Unit weight (kg/m$^3$) | 1158 | 1213 |
| Heat distortion temperature (°C.) Modulus in flexure 0.31 MPa, heating rate 50° C./h, sag (10 mm) | 191 | 238 |
| Modulus in shear (MPa) 20° C. | 503 | 568 |
| (DIN 53 445) 100° C. | 288 | 329 |
| 180° C. | 153 | 207 |
| Modulus in shear 180° C./20° C. | 0.30 | 0.36 |
| Linear expansion | 1.35 × 10$^{-6}$ | 0.85 × 10$^{-6}$ |

The moldings produced in accordance with 19B showed a higher heat distortion temperature and higher shear modulus values than the moldings produced with a standard commercially available isocyanate. The improvement in the linear expansion coefficient of the moldings produced in accordance with the invention over the comparison moldings was particularly noticeable. This is of considerable significance for the production of, for example, metal-containing composite materials in which the plastic is required to have a linear expansion coefficient of less than 10$^{-6}$.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a urethanemodified polyisocyanate having an NCO-content of from 5 to 30 wt. % comprising reacting
  (a) an organic polyisocyanate of the diphenylmethane series consisting of a mixture of 4,4'-diisocyanatodiphenylmethane with up to 20% by weight of 2,4'-diisocyanatodiphenylmethane, up to 5% by weight 2,2'-diisocyanatodiphenylmethane and from 5 to 60% by weight of higher homologues thereof, said percents by weight being based on the total amount of the mixture, with
  (b) an organic polyhydroxyl compound which is an alkoxylation product containing two alcoholic hydroxyl groups and having an OH number of from 112 to 389 of a bisphenol corresponding to the formula

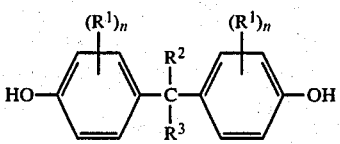

in which

R[1] represents a $C_1$–$C_4$ alkyl radical, chlorine or bromine,

R[2] and R[3] which may be the same or different each represent hydrogen or a $C_1$–$C_6$ alkyl radical or together with the carbon atom attaching the two aromatic rings form a 5-membered to 7-membered cycloaliphatic hydrocarbon radical and n represents 0 or an integer from 1 to 4 in quantities such that the ratio of NCO to OH equivalents is from 4:1 to 20:1.

2. The process of claim 1 in which the alkoxylation product has a hydroxyl number of from 200 to 354.

3. The process of claim 1 in which the organic polyhydroxyl compound (b) is the dipropoxylation product of bisphenol A.

4. A process for the production of polyurethane plastics by the isocyanate polyaddition process comprising reacting the urethane-modified polyisocyanate of claim 1 with an organic compound having isocyanate-reactive groups.

* * * * *